US008811987B2

(12) United States Patent
Selander et al.

(10) Patent No.: US 8,811,987 B2
(45) Date of Patent: Aug. 19, 2014

(54) METHOD AND ARRANGEMENT FOR CREATION OF ASSOCIATION BETWEEN USER EQUIPMENT AND AN ACCESS POINT

(75) Inventors: Göran Selander, Bromma (SE); Jari Vikberg, Järna (SE); Karl Norrman, Stockholm (SE); Rolf Blom, Järfälla (SE); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 453 days.

(21) Appl. No.: 13/140,818

(22) PCT Filed: Dec. 19, 2008

(86) PCT No.: PCT/SE2008/051536
§ 371 (c)(1),
(2), (4) Date: Jun. 17, 2011

(87) PCT Pub. No.: WO2010/071529
PCT Pub. Date: Jun. 24, 2010

(65) Prior Publication Data
US 2011/0256850 A1    Oct. 20, 2011

(51) Int. Cl.
*H04M 1/66* (2006.01)
*H04M 3/00* (2006.01)
*H04W 4/00* (2009.01)

(52) U.S. Cl.
USPC ......... 455/435.1; 455/410; 455/411; 455/418

(58) Field of Classification Search
USPC .............. 455/410–411, 416, 418–420, 432.3, 455/435.1, 463, 500, 507–508, 514, 550.1, 455/556.2, 516, 415, 423–425, 461, 517, 455/560–561; 709/202–203, 218–219, 225, 709/228, 244; 370/310, 328, 338, 349; 707/E17.045, 954, 960–962
See application file for complete search history.

(56) References Cited

U.S. PATENT DOCUMENTS 7,263,076 B1 *   8/2007   Leibovitz et al. ............. 370/310
7,415,274 B2 *   8/2008   Kauranen et al. .......... 455/435.2
(Continued)

FOREIGN PATENT DOCUMENTS

EP          1209942 A2     5/2002
WO    WO 2007/097673 A1   8/2007

OTHER PUBLICATIONS

International Search Report and the Written Opinion of the International Searching Authority, PCT Application No. PCT/SE2008/051536, Mar. 9, 2009 (19 pages).

(Continued)

*Primary Examiner* — Meless Zewdu
(74) *Attorney, Agent, or Firm* — Myers Bigel Sibley & Sajovec, PA

(57) ABSTRACT

Methods, apparatus, and computer program products for creating an association between a first user equipment and at least one access point assisted by a registration server in a telecommunication network are disclosed. The registration server responds to a first contact request carried out using a first association number for the access point, provided by the first user equipment, receives a first association request for the association with the access point, provided by the first user equipment, authorizes the first association request based on a first authorization information provided by the first user equipment; registers the association between the first user equipment and the access point responsive to authorization of the first association request. The first user equipment is associated with the access point and the association is administered by the registration server.

12 Claims, 11 Drawing Sheets

(56) References Cited

U.S. PATENT DOCUMENTS

| | | | |
|---|---|---|---|
| 7,509,124 B2* | 3/2009 | O'Neil | 455/432.2 |
| 7,551,574 B1* | 6/2009 | Peden et al. | 370/310.2 |
| 8,184,603 B2* | 5/2012 | Waylett et al. | 370/338 |
| 8,340,711 B1* | 12/2012 | Glass et al. | 455/552.1 |
| 2005/0059396 A1* | 3/2005 | Chuah et al. | 455/435.1 |
| 2007/0054668 A1* | 3/2007 | Scheinert et al. | 455/435.1 |
| 2007/0223435 A1* | 9/2007 | Mitsuhori | 370/338 |
| 2008/0132239 A1* | 6/2008 | Khetawat et al. | 455/438 |
| 2009/0222895 A1* | 9/2009 | Banga et al. | 726/5 |

OTHER PUBLICATIONS

International Preliminary Report on Patentability, PCT Application No. PCT/SE2008/051536, Nov. 23, 2010 (20 pages).

Second and Supplementary Notice Informing the Applicant of the Communication of the International Application, PCT Application No. PCT/SE2008/051536, Apr. 21, 2011 (1 page).

* cited by examiner

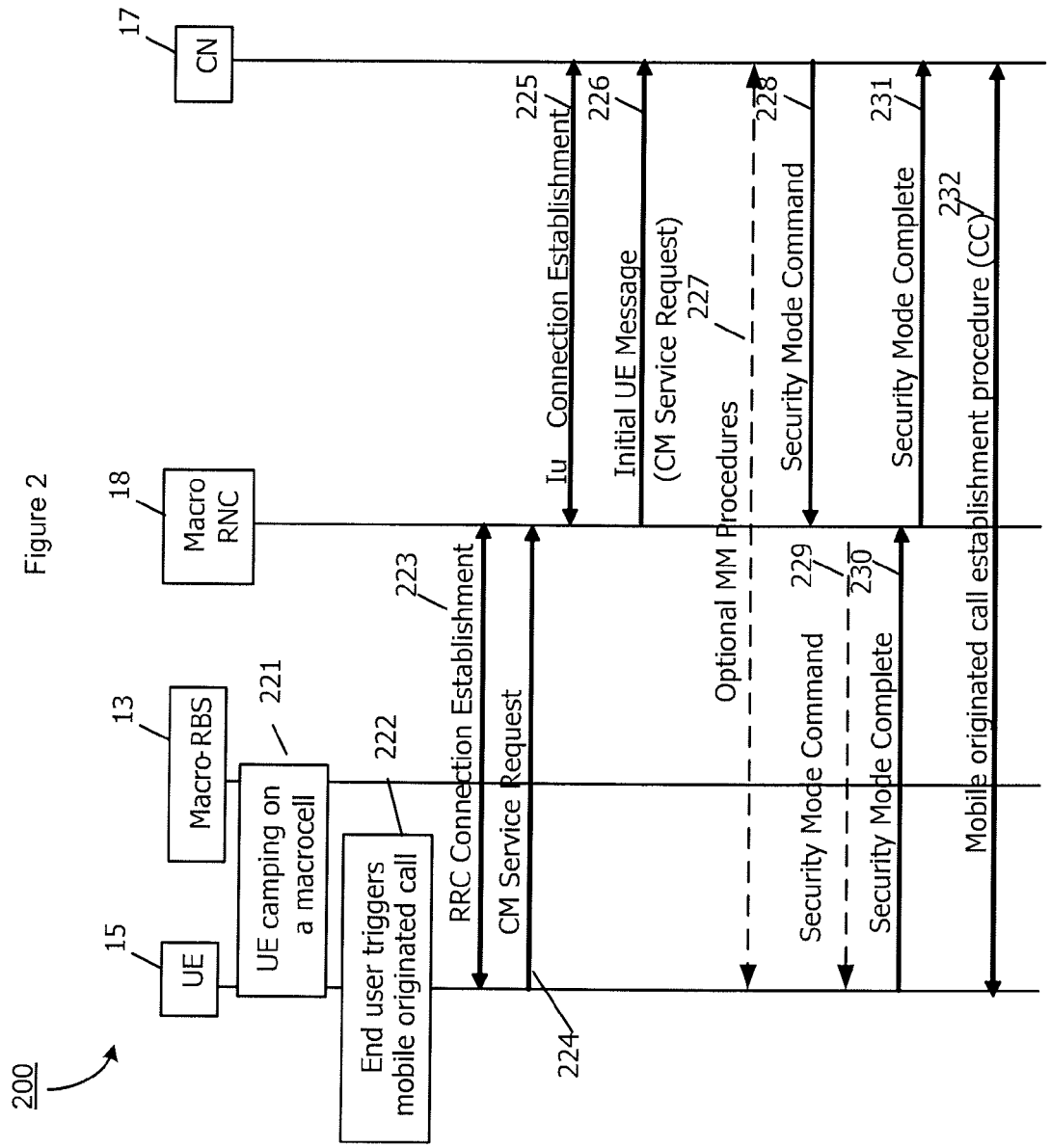

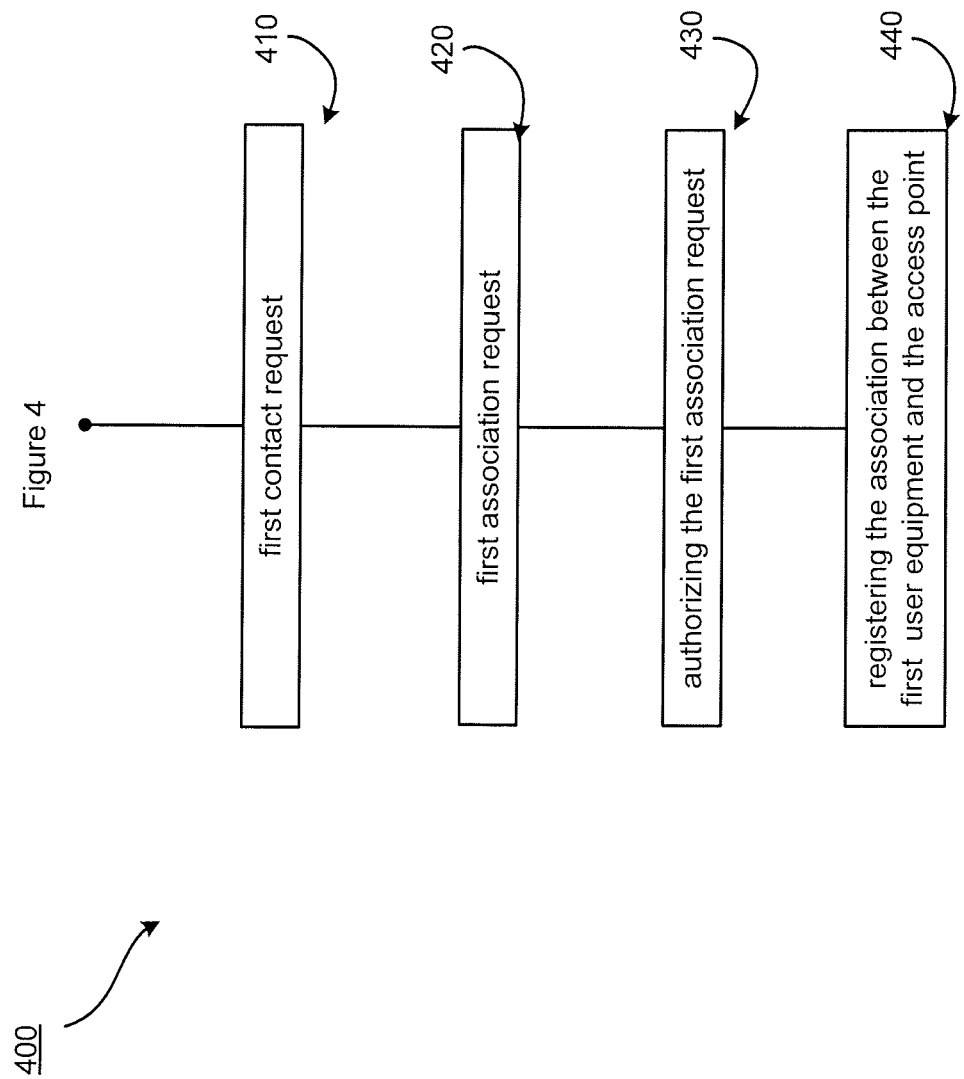

METHOD AND ARRANGEMENT FOR CREATION OF ASSOCIATION BETWEEN USER EQUIPMENT AND AN ACCESS POINT

CROSS REFERENCE TO RELATED APPLICATIONS

This application is a 35 U.S.C. §371 national stage application of PCT International Application No. PCT/SE2008/051536, filed on 19 Dec. 2008, the disclosure and content of which is incorporated by reference herein in its entirety. The above-referenced PCT International Application was published in the English language as International Publication No. WO 2010/071529 A1 on 24 Jun. 2010.

TECHNICAL FIELD

The invention relates to an association in a telecommunication network, and more particularly, to a method, a computer program product, a registration server, a user equipment, and an access point, of creating, in the registration server, such association between the user equipment and the access point.

BACKGROUND ART

In a telecommunication network such as a Global System for Mobile communications (GSM), small physical cells known as picocells may serve small physical areas such as parts of a building, a street corner, or an airplane cabin. The picocell is generally smaller than a microcell, which in turn, is smaller than a macrocell. The picocells are usually used to extend a cellular coverage in a telecommunication network to indoor areas where outdoor signals do not reach well. Further the picocells add the telecommunication network capacity in areas with a very dense user equipment (UE) usage, such as at train stations. The picocells are traditionally provided for the cellular coverage or as capacity extensions in the telecommunication network and do not include any specific access control mechanism. This means that all users allowed to access the macrocells of a public land mobile network (PLMN) are also allowed to access the microcells and the picocells of the PLMN.

A femtocell is defined to indicate that the cellular coverage area provided by the femtocell in the telecommunication network is relatively small and in some cases even smaller than the cellular coverage of the picocells. The femtocells are for a limited subset of users/subscribers and their UEs, so as to allow access to the PLMN in a more user-convenient way, by providing better service offering in general (e.g. better coverage and/or lower call charge).

In WO-2007/015067, a base station for a cellular wireless communications network has a first interface, enabling connection with a remote communications device using a cellular wireless communications protocol in the cellular wireless communications network. The base station also has a second interface, enabling connection over a wide area network, and a third interface, enabling connection over a local area network. Software enables communication over the wide area network between a remote communications device, connected to the first interface, and a core network of the cellular wireless communications network.

The base station may include security functions such as air interface ciphering, VPN connection to the core network, etc. This prior art also discloses the use of a USIM card in the base station that may be used to authenticate/identify the base station towards the network.

However, this does not provide for any local access control to the base station (and its services) from the local radio interface side. The prior art is intended to provide service for the owner of the premises in which the base station is located. As described, however, this prior art would provide access basically to any user, even users not inside the premises but rather in the vicinity. As described below, this may be highly undesirable.

Prior arts arrangements are known whereby a management interface (e.g. web based) to the base station may be used to configure the base station from a personal computer, e.g. by cable connection. The configuration may include that only certain MAC addresses should be granted access. This is, however, a very inconvenient procedure as it requires a separate device and interface for the base station. Also, the user must (somehow) find out the MAC address of authorized devices which requires knowledge and skill in order to retrieve this data from a low level "system interface" of each device. Also, it is typically very inconvenient to manually (from a key board) enter long, essentially random-looking device identifiers. In addition, this type of static configuration would disable the use of the base station also for critical emergency calls. Likewise, access control by use of security standards such as WEP, WPA(2) (common in Wireless LAN access points), are also too insecure and/or cumbersome for end-users to manage.

SUMMARY

An object of the invention is provide or at least contribute to a new access control management mechanism based on an association between an user equipment and an access point for a femtocell.

The invention relates to a method for creating, in a registration server, the association between a first user equipment and at least one access point. The method and the arrangement further includes a communication network comprising at least one communication device for providing communication between the first user equipment and the registration server. According to the method, the registration server performs the following steps of:

responding to a first contact request carried out using a first association number for the access point, which is provided by the first user equipment;

receiving a first association request for the association with the access point, which is provided by the first user equipment;

authorizing the first association request based on a first authorization information provided by the first user equipment;

registering the association between the first user equipment and the access point in case of a first successful authorization; whereby the first user equipment becomes an associated first user equipment associated with the access point, where the association is administered by the registration server.

In an embodiment, the registration server informs the associated first user equipment with a first registration confirmation in case of a successful first authorization.

In an embodiment, there exists in the registration server, provisions for creating a second association between a second user equipment and the access point, assisted by the associated first user equipment. The method may comprise that the registration server performs the following steps:

responding to a second contact request carried out using a second association number for the access point, where the second contact request is provided by the associated first user equipment;

receiving a second association request with an identification of the second user equipment, provided by the associated first user equipment;

authorizing the second association request based on a second authorization information provided by the associated first user equipment or the second user equipment regarding the second user equipment;

registering the second association between the second user equipment and the access point in case of a second successful authorization, whereby the second user equipment become an associated second user equipment associated with the access point, where the second association is administered by the registration server.

In an embodiment, the registration server informs the associated first and/or second user equipment with a second registration confirmation in case of a successful second authorization.

In an embodiment, the first and/or second association may be valid for a pre-defined time period or for a pre-defined amount of service.

In an embodiment, said communication device may be the access point for providing communication between the first and/or second user equipment and the registration server. In another embodiment, said communication device may be a macro radio base station for providing communication between the first and/or second user equipment and the registration server.

In an embodiment, said first and/or the second authorization information may be in the form of a first and/or a second short message service received by the registration server via an external macro network.

In an embodiment, the first and/or the second authorization information may be an access key information.

In an embodiment, the first and/or second association number may be identical for at least two access points.

In an embodiment, the first and/or second association is performed wherein the first and/or second user equipment provides the first and/or the second authorization information along with an access point identity specific for the access point to the registration server.

In an embodiment, the first user equipment and the access point are connected to the registration server coupled via an access point gateway. The registration server may perform the following steps: (i) responding to the authorization information from the first user equipment; and (ii) responding to the access point identity from the access point.

verifying if the first contact request and the first association request received from the first user equipment for association with the access point are valid within a registration server database;

if not, rejecting the first association request with the access point

In another aspect of the invention, there exist provisions for creating in the registration server, the association between the first user equipment and at least one access point. The method may comprise that the first user equipment performs the following steps:

contacting the registration server with the first contact request carried out using the first association number for the access point;

sending the first association request for the association with the access point, to the registration server; and providing the first authorization information for the authorization by the registration server, whereby the first user equipment become the associated first user equipment associated with the access point, where the association is administered by the registration server.

In an embodiment, the associated first user equipment may receive the first registration confirmation in case of a successful first authorization.

In an embodiment, there exist provisions in the registration server for creating the second association between a second user equipment and the access point assisted by the associated first user equipment. The method may comprise that the associated first user equipment performs the following steps:

contacting the registration server with the second contact request carried out using a second association number for the access point;

sending the second association request with the identification of the second user equipment;

providing the second association request based on the second authorization information regarding the second user equipment, whereby the second user equipment becomes the associated second user equipment associated with the access point, where the second association is administered by the registration server.

In an embodiment, the associated first and/or second user equipment receiving a second registration confirmation in case of the successful second authorization.

In an embodiment, the second user equipment can acquire the second authorization information from a short message service-service facility from a core network.

In an embodiment, the first user equipment can send the first and/or the second authorization information in the form of the first and/or second short message service, via the external macro network to the registration server.

In an embodiment, the second user equipment can send the second authorization information in the form of the second short message service, via the external macro network to the registration server.

In an embodiment, the access key information included in first and/or the second authorization information is derived from a secret key.

In an embodiment, the information derived from the secret key may include USIM AKA parameters.

In another embodiment, the access key information included in the first and/or the second authorization information may include a one-time password. In another embodiment, the access key information included in first and/or the second authorization information is a PIN code.

In an embodiment, the first and/or second association may allow the associated first and/or the second user equipment to access a CS call service via at least one access point. In another embodiment, the first and/or second association may allow the associated first and/or the second user equipment to access PS domain services via at least one access point.

In another aspect of the invention, there exist provisions for creating in a registration server, the association between the first user equipment and at least one access point. The method further may comprise the access point performing the following steps:

providing communication for the first contact request carried out using the first association number for the access point, between the first user equipment and the registration server;

forwarding a first association request for the association with the access point, from the first user equipment to the registration server;

forwarding the first authorization information to the registration server, whereby the first user equipment becomes the associated first user equipment associated with the access point, the association being administered by the registration server.

In an embodiment, the access point may associate with the associated first user equipment in case of the successful authorization by the registration server.

In an embodiment, the access point may perform the following steps:
- verifying if the contact request and the association request received from the user equipment for association with the access point are valid;
- if not, reject the user equipment association.

In another aspect of the invention, there exists a computer program product for the user equipment connected to the telecommunication network, for the association with the access point, administered by the registration server, the user equipment having a user equipment memory and a user equipment processor, the computer program product comprises a computer program, which comprises a code means which when run on the user equipment causes the user equipment to:
- contact the registration server with the first contact request carried out using the first association number for the access point;
- send the first association request for the association with the access point, to the registration server;
- provide the first authorization information for the authorization by the registration server.

In another aspect of the invention, there exists a computer program product for the registration server connected to the telecommunication network, the registration server administering the association between the user equipment with the access point, the registration server further having the registration server database and a processor unit, the computer program product comprises a computer program, which comprise a code means which when run on the registration server causes the registration server to:
- respond to the first contact request carried out using the first association number for the access point, provided by the first user equipment;
- receive the first association request for the association with the access point, provided by the first user equipment;
- authorize the first association request based on the first authorization information provided by the first user equipment;
- register the association between the first user equipment and the access point in case of the first successful authorization.

In another aspect of the invention, there exists a computer program product for the access point connected to the telecommunication network, for the association with the user equipment, administered by the registration server, further the access point having a access point memory and a processing unit, the computer program product comprises a computer program, which comprises a code means which when run on the access point causes the access point to:
- provide communication for the first contact request carried out using the first association number for the access point, between the first user equipment and the registration server;
- forwarding the first association request for the association with the access point, from the first user equipment to the registration server; forwarding the first authorization information to the registration server.

In another aspect of the invention, the registration server is connected to the telecommunication network, the registration server administers the association between the first user equipment with the access point, including the communication network comprising at least one communication device for providing communication between said first user equipment and the registration server, the registration server comprising:
- the registration server database;
- the processor unit;
- a contact means for responding to the first contact request carried out using the first association number for the access point, provided by the first user equipment;
- a receiving means for receiving the first association request for the association with the access point, provided by the first user equipment;
- an authorizing means for authorizing the first association request based on the first authorization information provided by the first user equipment;
- a registering means for registering the association between the first user equipment and the access point in case of the first successful authorization;

whereby the first user equipment becomes the associated first user equipment associated with the access point, where the association is administered by the registration server.

In an embodiment, the registration server administers the second association between the second user equipment and the access point assisted by the associated first user equipment, the registration server comprising:
- a responding means for responding to the second contact request carried out using the second association number for the access point, where the second contact request is provided by the associated first user equipment;
- the receiving means capable of receiving the second association request with the identification of the second user equipment, provided by the associated first user equipment;
- the authorizing means adapted for authorizing the second association request based on the second authorization information provided by the associated first user equipment or the second user equipment regarding the second user equipment; and that
- the registering means is capable of registering the second association between the second user equipment and the access point in case of the second successful authorization;

whereby the second user equipment become the associated second user equipment associated with the access point, where the second association is administered by the registration server.

In an embodiment, said communication device is the access point for providing communication between the first and/or second user equipment and the registration server.

In an embodiment, said communication device is the macro radio base station for providing communication between the first and/or second user equipment and the registration server.

In an embodiment, said first and/or the second authorization information is in the form of the first and/or the second short message service received via the external macro network.

In an embodiment, an informing means for informing the associated first user equipment with the first registration confirmation in case of the successful first authorization.

In an embodiment, the informing means is adapted to inform the associated first and/or second user equipment with the second registration confirmation in case of the successful second authorization.

In an embodiment, the first and/or the second authorization information includes access key information.

In an embodiment, the access key information included in the first and/or the second authorization information is derived from the secret key.

In an embodiment, the information derived from the secret key corresponds to the USIM AKA parameters.

In an embodiment, the access key information included in first and/or the second authorization information is the one-time password.

In an embodiment, the access key information included in the first and/or the second authorization information is the PIN code.

In an embodiment, the first and/or second association number is identical for at least two access points.

In an embodiment, the said first and/or second association is valid for the pre-defined time period.

In an embodiment, the registration server has a means for receiving the first and/or the second authorization information via the external macro network.

In an embodiment, said first and/or second association is performed wherein the first and/or second user equipment provides the first and/or the second authorization information along with the access point identity specific for the access point to the registration server.

In an embodiment, the first user equipment and the access point are connected to the registration server coupled via the AP gateway; the registration server comprising:
   a first responding means for responding to the first authorization information from the first user equipment;
   a second responding means for responding to an access point identity from the access point.

In an embodiment, the registration server comprising:
   a verifying means for verifying if the first and/or second contact request and the first and/or second association request received from the user equipment for association with the access point are valid within the registration server database;
   if not, a rejecting means for rejecting the first and/or second association request with the access point.

In another aspect of the invention, the user equipment connected to the telecommunication network, for the association with the access point, administered by the registration server, the user equipment comprising
   the memory;
   the processor;
   the contact means is capable of contacting the registration server with the first contact request carried out using the first association number for the access point;
   a sending means for sending the first association request for the association with the access point, to the registration server;
   a providing means for providing the first authorization information for an authorization by the registration server;
whereby the first user equipment become the associated first user equipment associated with the access point, where the association is administered by the registration server.

In an embodiment, the associated first user equipment having a confirmation means for receiving the first registration confirmation in case of the successful first authorization.

In an embodiment, the user equipment creates the second association between the second user equipment and the access point assisted by the associated first user equipment, the associated first user equipment comprising:
   the contact means is capable of contacting the registration server with the second contact request carried out using the second association number for the access point;
   the sending means is capable of sending the second association request with the identification of the second user equipment;
   the providing means is capable of providing the second association request based on the second authorization information regarding the second user equipment;
whereby the second user equipment become the associated second user equipment associated with the access point, where the second association is administered by the registration server.

In an embodiment, the associated first and/or second user equipment having the confirmation means for receiving the second registration confirmation in case of the successful second authorization.

In an embodiment, the second user equipment can acquire the second authorization information from the short message service-service facility from the core network.

In an embodiment, the first user equipment can send the first and/or the second authorization information in the form of the first and/or second short message service, via the external macro network to the registration server.

In an embodiment, the second user equipment can send the second authorization information in the form of the second short message service, via the external macro network to the registration server.

In an embodiment, the first and/or the second authorization information includes the access key information.

In an embodiment, the access key information included in the first and/or the second authorization information is derived from the secret key.

In an embodiment, the information derived from the secret key corresponds to the USIM AKA parameters.

In an embodiment, the access key information included in the first and/or the second authorization information is the one-time password.

In an embodiment, the access key information included in the first and/or the second authorization information is the PIN code.

In an embodiment, said first and/or second association allows the associated first and/or second user equipment to access the CS call service.

In an embodiment, said first and/or second association allows the associated first and/or second user equipment to access the PS domain service.

In another aspect of the invention, the access point connected to the telecommunication network, for the association with the user equipment, administered by the registration server, the access point comprising
   the access point memory;
   the processing unit;
   a first means for providing communication for the first contact request carried out using the first association number for the access point, between the first user equipment and the registration server;
   a second means for forwarding the first association request for the association with the access point, from the first user equipment to the registration server;
   a third means for forwarding the first authorization information to the registration server.

In an embodiment, an associating means for associating with the associated first user equipment in case of the successful authorization by the registration server.

In an embodiment, the access point comprising:
the verifying means is capable of verifying if the first and/or second contact request and the first and/or second association request received from the user equipment for association with the access point are valid;
if not, the rejecting means is adapted to reject the first and/or second association request with the access point.

BRIEF DESCRIPTION OF THE DRAWINGS

A more thorough understanding of the invention is derived from the detailed description along with the figures, in which:

FIG. 2 is a signalling diagram illustrating the flow of the signals for a combined radio and core network attach procedure between the UE and the telecommunication network i.e. between the UE, a radio access network (RAN) and a core network, FIG. 4 shows a flow diagram for creation of the association between a first UE and the AP, as performed by a registration server (RS)

DETAILED DESCRIPTION

Figure 1:
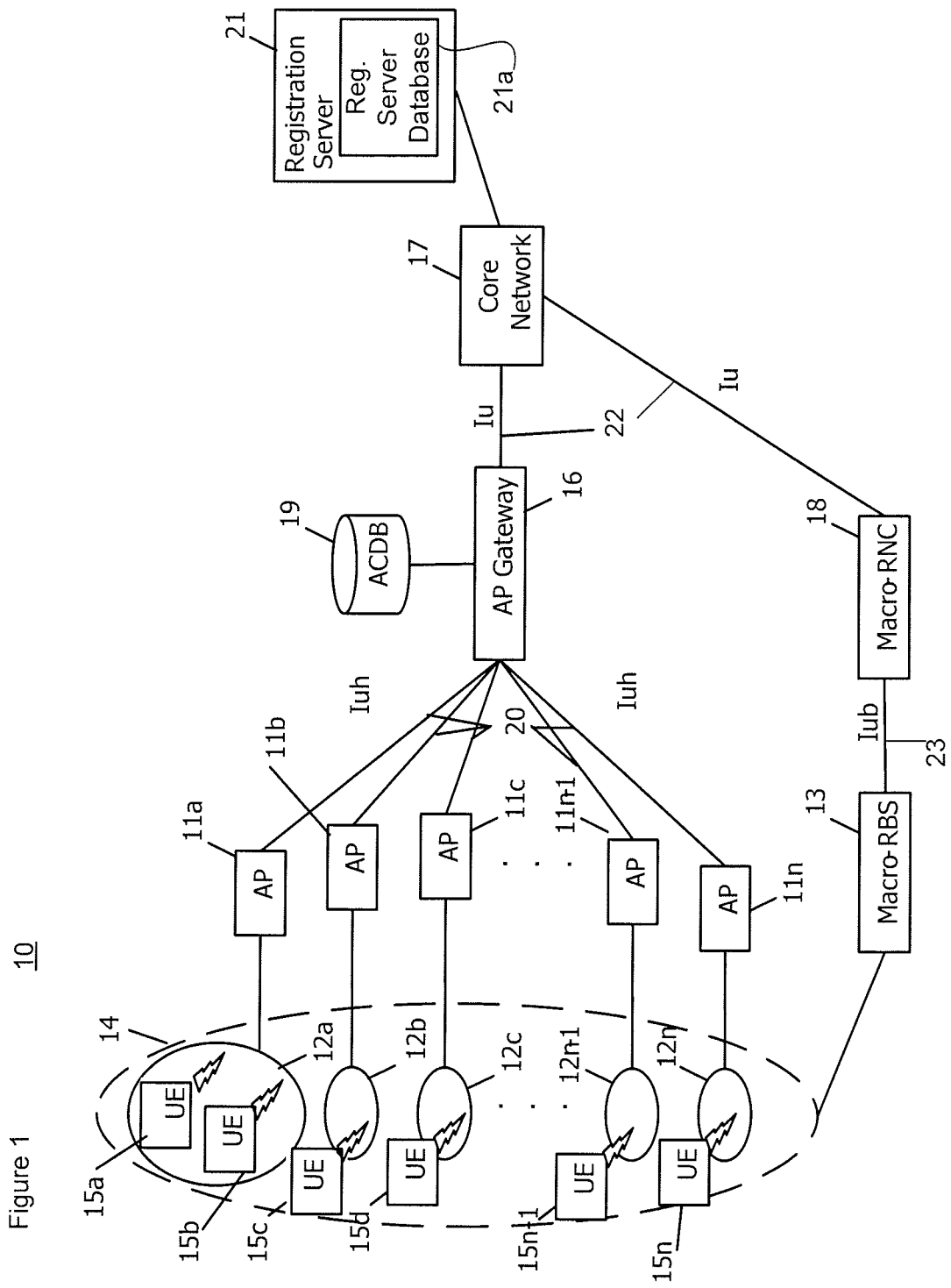
FIG. 1 shows a system overview for a method leading to creation of an association between a user equipment (UE) and a access point (AP)

The detailed description presents a method and an arrangement for creating, in an RS 21, an association between a UE 15 and at least one AP 11 creating a femtocell 12 for a cellular coverage in a telecommunications network. It should be understood that the association thereby created in the RS 21 is intended to form a basis for enforcement of an authorization/access control of various types of requests, made at a later stage by the UE 15, regarding the AP 11. For instance, the request made by the UE 15 may be a request for network services via the AP 11, e.g. request for a CS or a PS connection. Another example is that the request made by the UE 15 is a request to create another association between the AP 11 and some other UE 15. The associations created can also be used also for the authorization/access control purposes regarding other types of requests. I.e. the requests made by the UE 15 may generally pertain to communication and/or management requests regarding the AP 11, for which access control needs to be enforced.

Accordingly, the invention provides a new access control management mechanism (ACMM) based on the association between the UE 15 and the femtocell 12 with the cellular coverage in a small geographical area provided for by the AP 11. For example (as mentioned above), only the UE 15 for which the association with the AP 11 has been created, is granted access to a communication service provided in the femtocell 12.

The description uses the case when each AP 11 provides a single femtocell 12. However, the principles described are also valid in the case when the AP 11 provides and serves multiple femtocells 12a-n. In this case, the association would be created with between a particular AP 11 and the UE 15 from a particular femtocell 12 but would be valid for a plurality of the femtocells 12a-n, in general for all femtocells serviced by the AP 11.

The UE 15 may be any device that has transceiver capability to function in the telecommunication network. The ACMM functionality generally comprises both of creating the association and utilizing it to enforce an access control. However, as mentioned, the scope of the invention is related to the creation of the association, forming a basis for later enforcement. Accordingly, the association is defined as being validly in place when the ACMM within the scope of the invention is successfully completed between the UE 15 and the AP 11, whose function and arrangement will be described later on in the description in more detail. The association may, however, not be valid indefinitely as will also be discussed later.

The AP 11 has means for radio transmission/reception of communication to/from the UE 15 and further means for optical, wire line or wireless communication with the telecommunication network. The AP 11 has the functionality of converting communication between the UE 15 and the telecommunication network according to a physical and a medium access control protocols used on the respective link. The AP 11 may be a femto radio base station. The AP 11 may be a wireless access point. Further aspects of AP 11 will be described later i.e. in conjunction with FIG. 9 and related description.

Although described herein in terms of an embodiment in a Wideband Code Division Multiple Access (WCDMA) network, the invention may also be applied to other types of the telecommunication networks such as a Global System for Mobile communications (GSM) and an Evolved Packet System (EPS) networks. The invention is generally applicable to any case where AP 11 is to be associated with a limited set of UEs 15a-n i.e. only the limited set of UEs 15 should be granted a network access service through the AP 11. Examples of such AP 11 include but are not limited to e.g. those operating according to IEEE 802.11, 802.16, 802.20, or the like. In some embodiments of the invention, both a macrocell 14/a macro network is involved in creating the association with the femtocell 12/AP 11. While these terms have already been defined/exemplified in the case of cellular standards such as the GSM or the WCDMA, it should be noted that the distinction between the macrocell 14 and the femtocell 12 may not exist in some wireless technologies. To exercise the invention in such cases it is however still possible to use the embodiments involving macrocells. The macrocell 14 could in that case simply be provided by a different access technology. For example, the association with a 802.11 WLAN AP may, in an embodiment of the invention, involve communication taking place over a GSM/WCDMA macro cell. For instance, the UE 15 may in this case be a dual-radio UE supporting both the IEEE 801.11 and the GSM/WCDMA. In a similar fashion, even though the description is based on femtocells 12 with limited coverage, the given description, principles and methods apply to any types of cells that benefit from the ACMM functionality. In a similar manner, the invention applies also for non-wireless accesses such as IEEE 802.3, xDSL, etc where the "access point" would correspond to a customer premises equipment (CPE). As is apparent to one of skill in the art, the invention can be practiced in any scenario where UE 15 and AP 11 have unique identifiers, e.g. IMSI (International Mobile Subscriber Identity), IMEI (International Mobile Equipment Identity), NAI (Network Access Identifier), Ethernet interface ID e.g. 48-bit IEEE (802.3) MAC address, 802.11 STA ID (client Station ID)/SSID (service set identifier), 802.16 BSID(base station identifier)/MSID (mobile station identifier), cell ID, CDMA2000 ATI (Access Terminal Identifier), and where the RS 21 is reachable from the UE 15 via the use of an association number (AN) which may be a phone number, an IP (Internet Protocol) or Ethernet address, a URL (Uniform Resource Locator), NAI, etc.

FIG. 1 shows, an arrangement 10 according to an embodiment of the invention. In a radio access network (RAN) for the WCDMA network comprising both the macrocells 14 and the femtocells 12, a number of the AP 11*a-n* serves small geographical coverage areas referred to herein as the femtocells 12*a*-12*n*. In the femtocell 12, the cellular coverage area is relatively small compared to a microcell or a picocell or the macrocell 14, which are generally associated with the existing types of cells in the telecommunication networks. A Macro-RBS 13 likewise serves a large macrocell area 14, which in the example cover the same area as a number of femtocells.

Each one of the AP 11*a-n* provides the WCDMA coverage for the UEs 15*a-n* and are connected to a AP Gateway (AP-GW) 16. An interface between the AP 11 and the AP-GW 16 is known as a Iuh interface 20 and i.e. is being standardized in a Third Generation Partnership Project (3GPP) for a 3GPP Release-8. The Iuh interface 20 may for example be formed by an IP based connection over an IP network. The Iuh interface 20 resembles an Iu Interface 22, but is modified conveying additional information between the AP 11 and the AP-GW 16 and is optimized mostly for handling of very high number of APs 11 i.e. as compared to for example the number Macro-RBSs 13 in the telecommunication network, to enable more efficient transport of the protocols and also for more optimized implementation of the AP-GW 16. The Iuh interface 20 may contain new procedures such as an AP-GW Discovery, an AP Registration to the AP-GW 16 and a UE Registration to the AP-GW 16. In some cases, the IP-based transmission utilizes a Fixed Broadband access (such as e.g. xDSL, Cable, etc.) to connect the AP 11 to the AP-GW 16.

In another case, a variant of a Wireless Broadband access (for example, WiMAX) may be utilized between the AP 11 and the AP-GW 16. The AP-GW 16 may then be connected to a core network (CN) 17 utilizing the Iu Interface 22. The CN 17 may comprise for example a Mobile Switching Center (MSC) in the CS domain and a Serving General Packet Radio Service (GPRS) Support Node (SGSN) i.e. in a PS domain. The Macro-RBS 13 may connect to a Macro-RNC 18 utilizing an Iub Interface 23, and the Macro-RNC 18 connects to the CN 17 utilizing the Iu Interface 22.

There are different possibilities to perform the ACMM in the telecommunication network comprising femtocells 12 depending on the impact allowed in different parts of the telecommunication network. For example, one case is when neither the UE 15 nor the CN 17 are allowed to be modified. This scenario is the most assumed one for initial deployments and it can thus be assumed that parts of the ACMM functionality (e.g. access control enforcement, etc) needs to be introduced in the RAN (i.e. either in the AP 11 or in the AP-GW 16) without impacting any UE 15 or CN 17 functionality and is called a RAN-based ACMM. Another situation i.e. in the 3GPP standards (and in AP 11 deployments) is when a concept known as a Closed Subscriber Group (CSG) is being used. With the CSG, a particular AP 11 can be associated to certain UEs 15, meaning that only these associated UEs 15 are allowed to access the AP 11. In actuality, a CSG is associated with a group of subscribers rather than with UEs 15, but for simplicity the term UE 15 will often be used as the entity of which the CSG is formed. Allowed CSG Identities (CSG-ID) are stored in the UE 15 in a so called CSG Whitelist. Each AP 11 broadcasts in a System Information (SI) both a "CSG Indicator" (i.e. Boolean type of indicator) and the CSG-ID allocated to it. This means that the UE 15 can determine (by reading the CSG-ID from the SI and comparing this to the contents of the CSG Whitelist) whether it is allowed to access the particular AP 11. The allowed CSGs (Closed Subscriber Groups) for a UE are also stored in the CN 17, so that the CN can perform an ultimate ACMM, e.g. in case the UE 15 has an outdated CSG Whitelist. This variant is called a CN-based ACMM. Note however that this approach to the ACMM alone, only works securely if the UE 15 is co-operative. I.e. the CSG white-listing does not prevent a "malicious" UE 15 from attempting to access the AP 11. Also, the problem of creating the associations needs to be handled in a secure and efficient way.

One way to implement the RAN-based ACMM is to introduce an Access Control Database (ACDB) 19 in the RAN. The ACDB 19 stores information regarding the AP 11 and which UEs 15 are authorized to access the femtocell 12 provided by each AP 11. The AP-GW 16 may retrieve information from the ACDB 19 so that it is able to perform the ACMM or parts thereof. Each UE 15 may be identified by its International Mobile Subscriber Identity (IMSI) or by some other permanent mobile identity. Each AP 11 is identified using, for example, a preconfigured AP Identity (AP-ID). The ACDB 19 is shown in FIG. 1 as a standalone unit. However, in another use case, it is a functional entity that alternatively may be incorporated in the AP-GW 16 or in the AP 11. According to i.e. the 3GPP, this means that the AP-GW 16 must perform the ACMM and therefore have access to the ACDB 19. However, it is also allowed that AP 11 does the ACMM and because of this, the ACDB 19 may need to be accessed also from the AP 11.

Alternatively, a CN-based ACMM can be implemented for example by defining the CSG Whitelist for each UE 15 in a Home Location Register (HLR)/Home Subscriber Server (HSS) (not shown in FIG. 1) node in the CN 17. In this case, the other CN 17 nodes, like the MSC and the SGSN, will receive the CSG Whitelist information for the UE 15 as part of the subscriber profile that is downloaded from the HLR/HSS to the CN node(s) where the UE 15 is attached to.

The invention addresses aspects of the ACMM, which is important to gain the user acceptance for the AP 11 concept. When the femtocell 12 served by the AP 11 is used to enhance a local cellular coverage, for example in a home or a Small Office or a Home Office (SOHO) environment, only the UE 15 belonging to the home or an enterprise should be allowed to access the femtocell 12 provided by the AP 11. The user/subscriber or the SOHO may have purchased the AP 11, or may be paying for the transmission towards the AP-GW 16 and CN 17. The AP 11 may serve only a limited number of the users and their UEs, so it is important that authorized users do not experience bad quality or are denied access because of i.e. an unauthorized user have used the available bandwidth or exceeded the maximum number of allowed users associated with the AP 11.

The process of creating the association between the UE 15 and the AP 11 as basis for the ACMM according to an embodiment of the invention may start with a combined radio and CN (CRCN) attach process. FIG. 2 illustrates an embodiment for the CRCN attach procedure between the UE 15 and the CN 17. This attach process however may be done in numerous ways. In FIG. 2, the UE 15 accesses the telecommunication network via the macrocell 14 provided by the Macro-RBS 13. In another embodiment, similar steps would take place if the UE 15 was accessing the telecommunication network via the femtocell 12 provided by the AP 11. Thus the association creation as part of the ACMM may be performed via the femtocell 12. The CRCN attach process may use the UE 15, the Macro-RBS 13, the Macro RNC 18 and the CN 17 nodes. The association process may also be performed for example from a UE 15 connected to a fixed PSTN.

The steps before the procedure for the association are important factors in determining whether the association process is performed via the Macro-RBS 13 or the AP 11. If the UE 15, first attempted to access the femtocell 12 and was rejected using either the RAN or the CN 17 based ACMM, then the resulting actions depend on whether there exists accessible macrocells 14 in the location of the AP 11 where the UE 15 was not allowed to access. If such macrocells 14 exist, the UE 15 will camp on those macrocells 14 and the procedure for the association is performed via the Macro-RBS 13 serving that macrocell 14. If on the other hand, no such macrocells 14 exist, the UE 15 will camp on the femtocell 12 in a limited service state and in this case the association process will be performed via the AP 11. The handling of the association process in this case is similar to handling of emergency calls i.e. the telecommunication network will allow the UE 15 to perform the procedure for the association in a similar way as emergency calls are allowed.

Thus for the CRCN attach process using the macrocell 14, the steps are described in detail here. In a first step 221, the UE 15 is initially camping on the macrocell 14. To be camping on a cell i.e. the macrocell 14 means that the UE 15 has selected a specific cell, i.e. it has performed a cell selection/reselection processes. Camping also means that the UE 15 is in an idle mode, i.e. no CS call nor PS activity. Furthermore the UE 15 is able to read system information e.g. broadcasted in the macrocell 14, is able to establish calls or PS sessions and is also able to receive a paging signaling. In a second step 222, the end user triggers a UE 15 originated call. In a third step 223, an RRC layer in the UE 15 triggers an RRC connection establishment by sending an RRC CONNECTION REQUEST message to the Macro-RNC 18 (via the Macro RBS 13) on a Random Access Channel (RACH). The RRC connection is further established using existing principles as defined in 3GPP TS 25.331. In a fourth step 224, once the RRC connection is successfully established between the UE 15 and the Macro-RNC 18, the UE 15 sends a CM SERVICE REQUEST message to the CN 17 via the Macro-RNC 18. In a fifth step 225, the Macro-RNC 18 triggers the establishment of an Iu signaling connection towards the CN 17. In a sixth step 226, the Macro-RNC 18 sends an INITIAL UE MESSAGE to the CN 17. This message contains the CM SERVICE REQUEST and other information. The Iu signaling connection may be established using existing principles as defined in e.g., 3GPP TS 25.413 specifications. In a seventh step 227, the CN 17 may trigger optional Mobility Management (MM) procedures, such as an Identification and/or an authentication towards the UE 15. In an eight step 228, the CN 17 triggers a Security Mode command procedure in the Iu Interface 22. In a ninth step 229, this triggers the sending of the RRC protocol SECURITY MODE COMMAND message to the UE 15. In a tenth step 230, the UE 15 responds with a RRC protocol SECURITY MODE COMPLETE message. This triggers the sending of the SECURITY MODE COMPLETE message in the Iu Interface 22 in an eleventh step 231. In a twelfth step 232, the UE 15 and the CN 17 perform the mobile originated call establishment signalling on the Call Control (CC) level. The CRCN attach process is now completed.

Figure 3A:
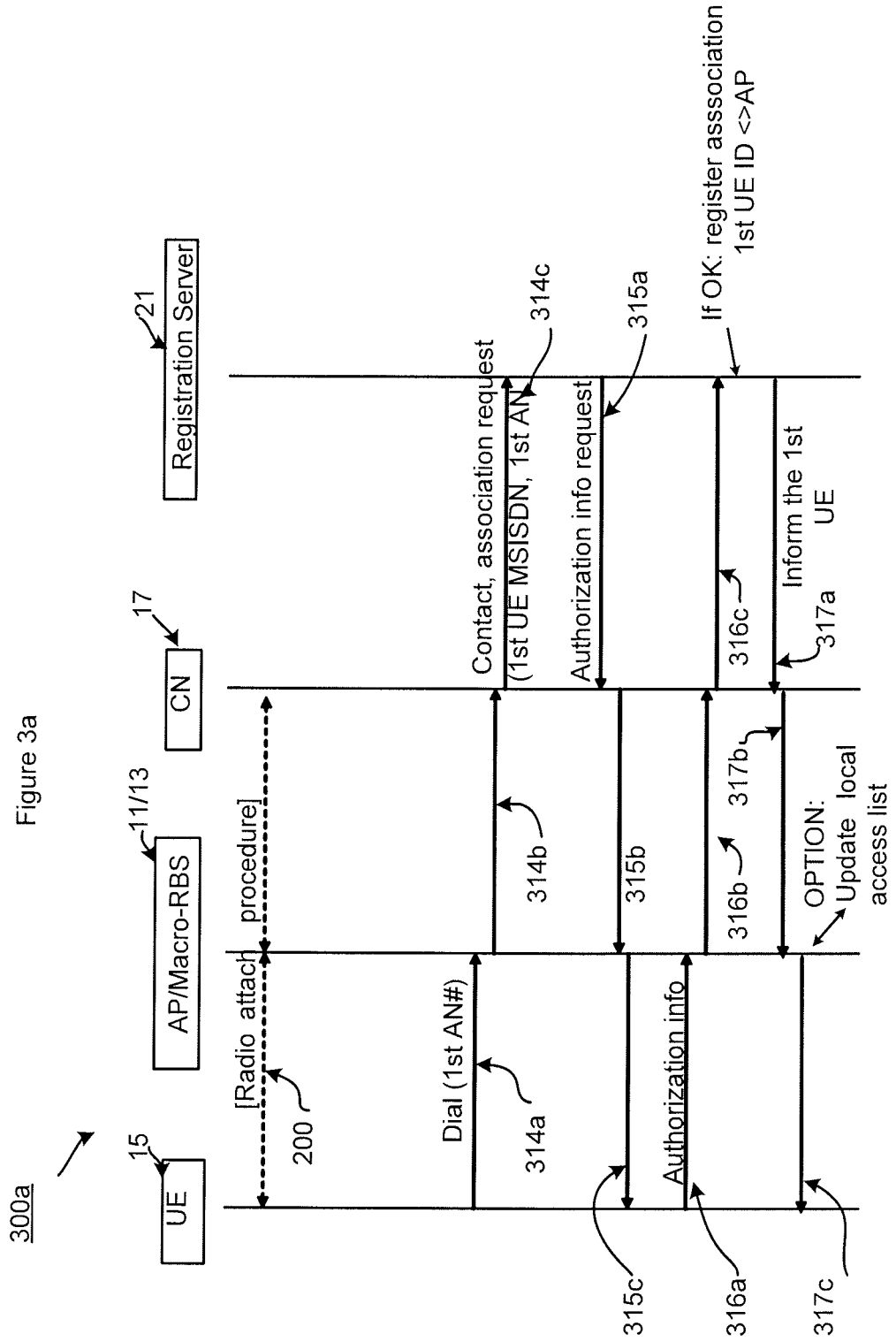
FIG. 3a is a signalling diagram illustrating the flow of the signals for a method leading to creation of an association between a first UE and the AP.

Once the CRCN attach process is completed, the ACMM can be performed according to FIG. 3a for the association between the UE 15 with the AP 11. Before the ACMM can be implemented, for example, only emergency (e.g., a 911) calls and/or a call to an operator are allowed if the UE 15 is camping in the limited service state in an unallowed femtocell 12. It is only after the procedure for the association is complete, that a CS and/or the PS calls/connections can be established via that femtocell 12. FIG. 3a shows the case when the UE 15 is camping in a normal service state in an allowed macrocell 14 and the association process is performed via a Macro-RBS 13.

In FIG. 3a, a signalling diagram 300a for an embodiment for creation of the association between the UE 15 and the AP 11 is shown. The steps illustrated here will also be used to clarify and provide support to embodiments presented later on in the detailed description. In a first step 200, the CRCN attach process is performed i.e. according to procedure already explained above.

The AP 11 and/or a AP subscription are linked, for example with the AN. As mentioned, the AN may typically be a phone number, but it could also be some other address information how to reach the registration server, e.g. IP address, URL, etc. In case the AP 11 is e.g. a WCDMA AP/femto radio base station, there may be some advantages to using a conventional phone number in case the association is set up via the AP 11 itself. Specifically, a secondary attach procedures and a resource allocation (e.g. for a GPRS connectivity) would not be necessary. If the association is made via a Macro-RBS 13 (or some other telecommunication network node) however, it would allow almost any form of "addressing" the RS 21. In any case, the AN is known to the UE 15 (or its user), it may be preregistered in the telecommunication network/the CN 17 and/or the AP 11. In another embodiment, the AN may be a Mobile Subscriber ISDN Number (MSISDN) entry corresponding to the IMSI of a (U)SIM card that is used to authenticate the AP 11 to the CN 17. In a second step 314a-c, the UE 15 dials the AN through the Macro-RBS 13, where a call is placed to the RS 21 via the CN 17 using a contact means 157b and a sending means 157c respectively for the purpose of sending a contact request and an association request to the RS 21. The RS 21 has a receiving means 21c capable of receiving the association request. The RS 21 identifies the UE 15 based on a calling party identity (e.g. its MSISDN) number and it also sees the AN used by the UE 15. This information is enough for the RS 21 to identify which UE 15 is performing the contact and the association request and which AP 11 is aimed to be used. In an alternate embodiment, the contact request and the association request may be sent separately to the RS 21 via the AP 11 and the CN 17.

In a third step 315a-c, the RS 21 sends an authorization information request to the UE 15 through the Macro-RBS 13 and the CN 17. In a fourth step 316a-c, the UE 15 using a providing means 157d replies and sends an authorization information via the Macro-RBS 13 and the CN 17 to the RS 21. If the authorization information is correctly verified, the RS 21 using an authorizing means 21d updates the association in its RS database 21a with both the UE's 15 identifier (e.g. MSISDN and IMSI values) and the AP's 11 identity (i.e. the AP-ID based on for example the AN), thereby a registering means 21e are used for registering the association between the UE 15 and the AP 11. Note that the association is at this point registered in the RS database 21a but not necessarily known by the AP 11. In a fifth step 317c, the RS 21 using an informing means 21g may send an association confirmation/result code, i.e., as an 'OK' or a 'no OK' message to the UE 15. The UE 15 has a confirmation means 157e for receiving a registration confirmation in case of a successful authorization. The association in the RS database 21a is also forwarded to the relevant nodes needed depending on if it is the RAN or the CN-based ACMM that is used in the network. For example, when the CN-based ACMM is used, the association details are forwarded to the HSS/HLR to be included as part of the UE's 15 subscription profile and so it can be pushed towards the needed other core network nodes. If the RAN-based ACMM is used, then the association details are forwarded to the relevant nodes in the RAN such as the AP 11 itself and/or the AP-GW 16 or the ACDB 19. If the association is created (only) for the purpose of allowing the UE 15 to create further associations between the AP 11 and other UEs 15 (as will be described in detail below), then it may not be necessary to forward the association details outside the RS 21 itself. That is, the RS 21 only records creation of the association between the AP 11 and the UE 15 for later use by the RS 21 itself. Although the steps above describe use of the macro-RBS 13 in the association procedure, the procedure is equally valid for use of the AP 11 for the association procedure, the only difference being that the UE 15 (before the association) is by the CN/RAN considered in a limited service state so that only calls to the AN and/or emergency calls are possible.

Figure 3B:
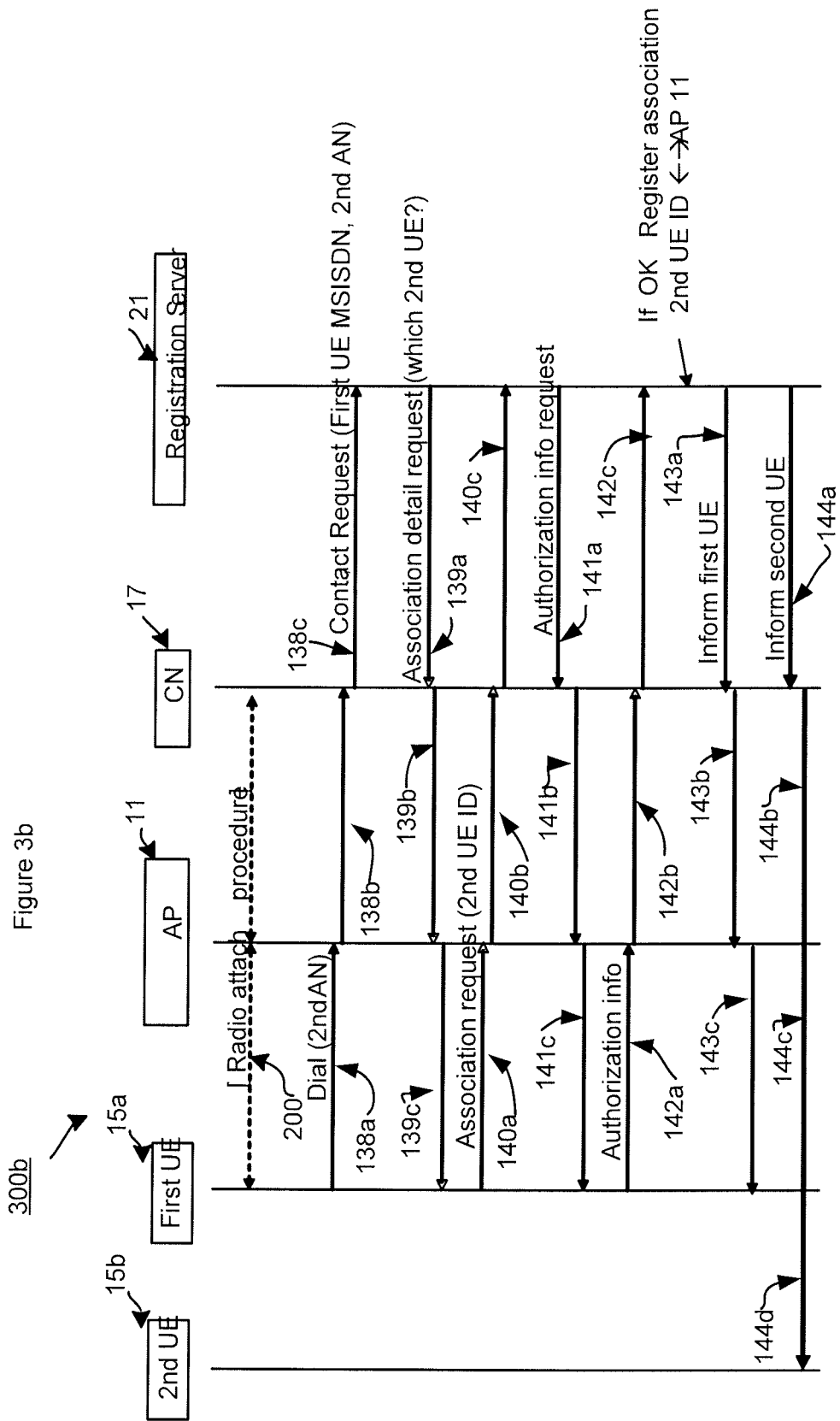
FIG. 3b is a signalling diagram illustrating the flow of the signals for a method leading to creation of a second association between a second UE and the AP.

In FIG. 3b, a signalling diagram 300b for an embodiment for creation of the second association between a second UE 15b and the AP 11 is shown. This second association is assisted by a first UE 15a, which is already associated with the AP 11 i.e. according to previous embodiments. In a first step 200, the CRCN attach process may be performed i.e. according to procedure already explained above by the first UE 15a. In a second step 138a-c, the associated first UE 15a, dials a second AN and using the contact means 157b sends a second contact request to the RS 21. The RS 21 will first typically consult its database 21a to verify that the the first UE 15a is already associated with the AP 11. The RS 21 has a responding means 21f for responding to the second contact request. In a third step 139a-c, the RS 21 returns toward the associated first UE 15a, with an association detail request regarding which second UE 15 needs to be associated with the AP 11. In a fourth step 140a-c, the associated first UE 15a using the sending means 157c sends a second association request with the second UE 15b details (e.g. identifier for the second UE 15b) to the RS 21. The RS 21 has the receiving means 21c for receiving the second association request. In a fifth step 141a-c, the RS 21 sends a request for a second authorization information to the associated first UE 15a. In a sixth step 142a-c, the associated first UE 15a using the providing means 157d sends the second authorization information to the RS 21. The second association is processed and, if successfully authorized respectively using the authorizing means 21d and the registering means 21e registered in the RS 21. In a seventh step 143a-c, the RS 21 using the informing means 21g informs the associated first UE that the second association is completed for the second UE 15b. In an optional eight step 144a-d, the RS 21 using the informing means 21g informs the second UE 15b that it is now associated with the AP 11 and is now an associated second UE 15b. The associated first and/or second user equipment have the confirmation means 157e for receiving a second registration confirmation in case of a successful second authorization.

FIG. 4 describes procedural steps 400 performed by the RS 21, for the association of the first UE 15a with at least one AP 11. The procedure for the association of the first UE 15a further includes a communication network comprising a communication device for providing communication between the first UE 15a and the RS 21. The communication device may either be the AP 11 or the Macro-RBS 13 as shown in FIG. 1 and may be used alternatively in the different embodiments described later in the description.

In procedure 400 the RS 21 performs the following steps for the association of the first UE 15a with the AP 11. In a first step 410, the RS 21 responds to a first contact request carried out using a first AN for the AP 11, provided by the first UE 15a. Here the first AN may be specific/unique for the AP 11. In a second step 420, the RS 21 receives a first association request for the association with the AP 11, provided by the first UE 15a. Both the first contact request and the first association request can be sent according to the first step 314a-c in FIG. 3, i.e. the RS 21 receives such request via the AP 11 and the CN 17 from the first UE 15a. In an alternate embodiment, the first contact request and the first association request may be sent separately to the RS 21 by repeating the first step 314 in FIG. 3. In another embodiment, the RS 21 makes a request for the authorization information. In a third step 430, the RS 21 authorizes the first association request based on a first authorization information provided by the first UE 15a. The first authorization information may be exemplified by different embodiments and will be described later on. In a fourth step 440, the RS 21 registers the association between the first UE 15a and the AP 11 in case of a first successful authorization. The first UE 15a becomes now an associated first UE 15a associated with the AP 11, where the association is administered by the RS 21. Again, note that the association is at this point registered in the RS 21 but not yet known by the AP 11.

In another embodiment of the procedure 400, the RS 21 informs the associated first UE 15a with a first registration confirmation in case of a successful first authorization, i.e. similar to steps 317a-c of FIG. 3. The associated first UE 15a can now place the CS call or PS sessions through the AP 11 utilizing the telecommunication network of FIG. 1.

Figure 4A:
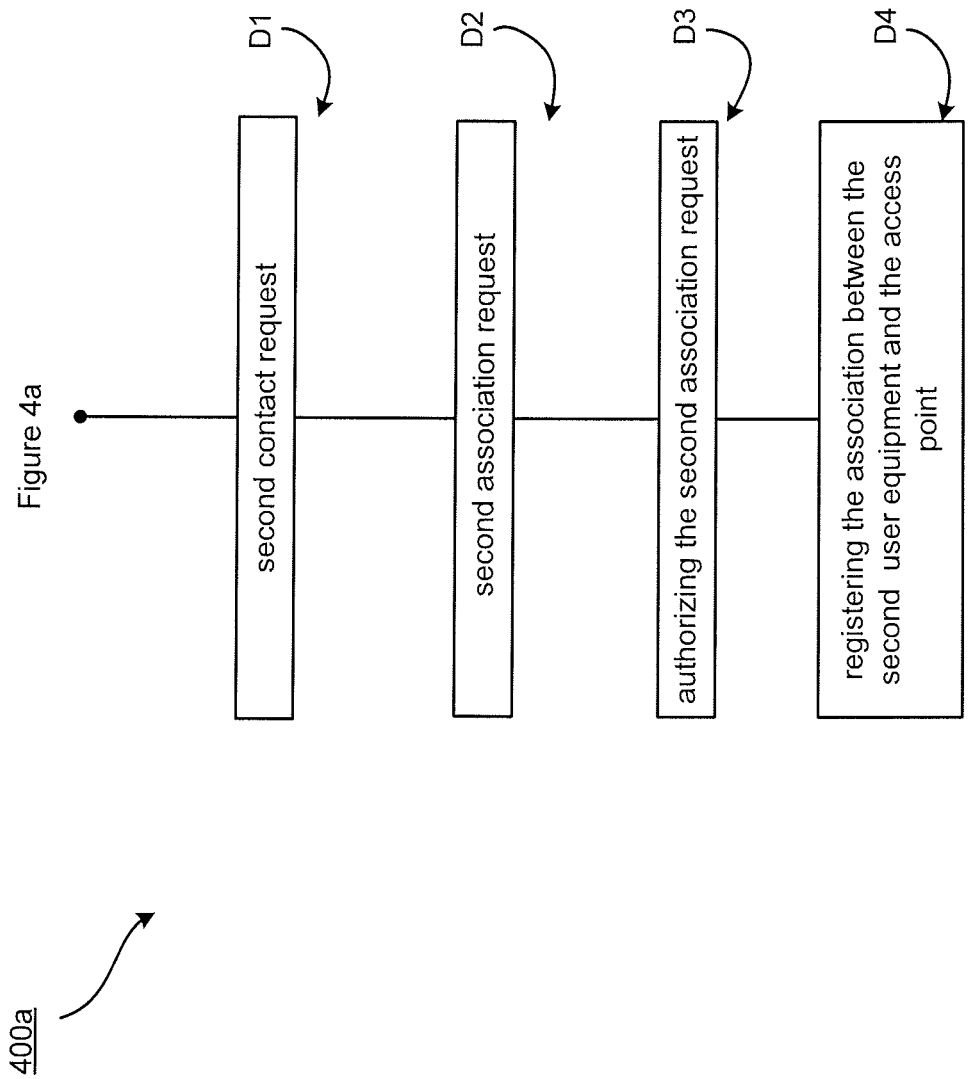
FIG. 4a shows a flow diagram for creation of the second association between the second UE and the AP, assisted by the associated first UE, as performed by the RS.
Figure 4B:
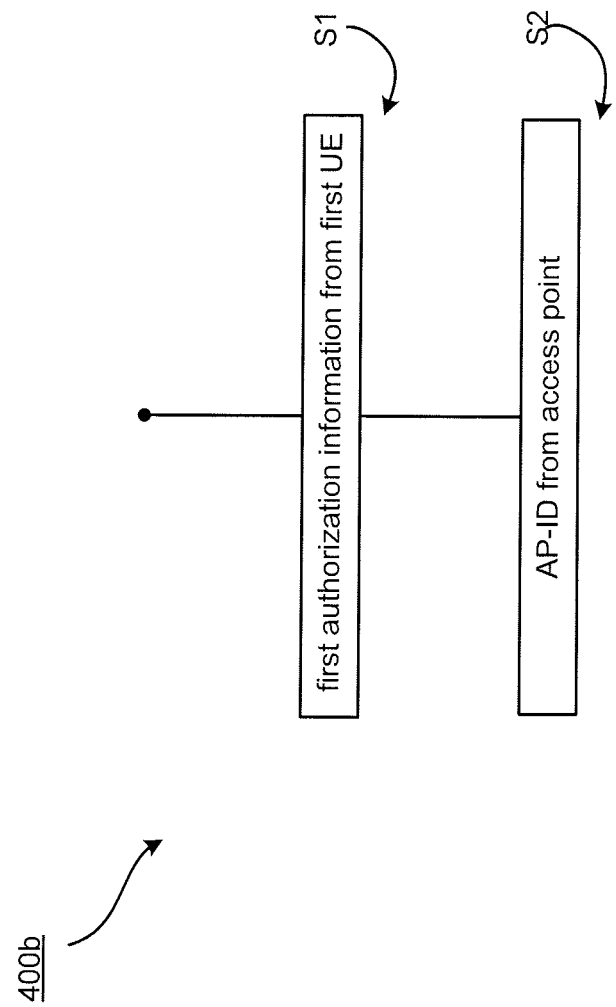
FIG. 4b shows a flow diagram for creation of the association between the first UE and the AP, when connected via the AP Gateway (AP-GW) and core network (CN), as performed by the RS.

In another embodiment of the procedure 400 and 300b, there exists functionality in the RS 21 for creating the second association between the second UE 15b and the AP 11, assisted by the associated first UE 15a. Here the first UE 15a functions as a master UE that will assist with getting the second UE 15b associated with the AP 11. FIG. 4a shows a procedure 400a for the ACMM for the second association of the second UE 15b. The procedure 400a further comprises that the RS 21 performs the following steps. In a first step D1, the RS 21 responds to the second contact request carried out using the second AN for the AP 11, provided by the associated first UE 15a i.e. step 139a-c. Here the second AN may be identical to the first AN. In another embodiment, the second AN may be different from the first AN. Some alternate embodiments relating to the AN will be covered later on in the description. In a second step D2, the RS 21 receives the second association request with an identification of the second UE 15b, provided by the associated first UE 15a i.e. in step 140a-c in the procedure 300b. In a third step D3, the RS 21 authorizes the second association request based on a second authorization information provided by the first UE 15*a* regarding the second UE 15*b*. In an embodiment, the second authorization information may be the same as the first authorization information. In a fourth step D4, the RS 21, registers the second association between the second UE 15*b* and the AP 11 in case of a second successful authorization. The second UE 15*b* now becomes the associated second UE 15*b* associated with the AP 11, with the second association administered by the RS 21.

In another embodiment of procedure 400*a*, the RS 21 informs the associated first and/or second UE 15*a, b* respectively with a second registration confirmation in case of a successful second authorization. The associated second UE 15*b* may now place the CS calls or PS sessions through the AP 11 utilizing i.e. the telecommunication network of FIG. 1. Similarly, the associated first UE 15*a*, may assist in the ACMM as shown above to get other UE 15 associated with the AP 11.

In an embodiment, a first and/or a second association may allow the first and/or the second UE 15*a/b* the right to create further associations between the second and/or a third UE b/c and the at least one APs 11.

In another embodiment, the second UE 15*b* also becomes registered in the RS 21 as a second master UE associated with the AP 11, henceforth able to carry out further associations on behalf of the third, a fourth, etc, UE 15*c-n*, similar to the first UE 15*a* as just described. In another embodiment, the second UE is, however, not registered as the master UE 15.

In another embodiment of embodiment 400/400*a*, the first and/or second association may be valid for a pre-defined time period or pre-defined amount of service. The pre-defined time period is consequential to the subscription, the UE 15 user, a vendor, a supplier or the operators criteria defined. The pre-defined amount of service may be expressed in quantity of transferred data, number of calls, etc. As the communications network will generally be able to distinguish connections made via the AP 11 from connections made via an external macro network to provide differentiated charging based on accounting, the accounting function (not shown) could be utilized to determine when the amount of service threshold has been reached.

In another embodiment of procedure 400/400*a*, the communication network may use the AP 11 for providing communication between the first and/or second UE 15 and the RS 21. This is when the ACMM is fully or partially handled via the AP 11. Until the association is completed between the UE 15 (i.e. first and/or second UE) and the AP 11, no call/communication can be placed through the telecommunication network via the AP 11. But the AP 11 can provide communication between the UE 15 and the CN 17/RS 21 based on usage of the AN.

In another embodiment of procedure 400/400*a*, said communication network may use the Macro-RBS 13 for providing communication between the UE 15 (i.e. first and/or second UE 15) and the RS 21. In this embodiment, the invention uses the external macro network (providing connections to CN 17) wherein using the Macro-RBS 13 for the communication during creation of the association for the ACMM.

In another embodiment of procedure 400/400*a*, the first and/or the second authorization information may be in a form of a first and/or a second short message service (SMS) that the RS 21 may receive via the external macro network.

The first UE 15*a*, may receive the first authorization information from the vendor, the supplier, or the operator or a SMS service facility described later in the description. The first authorization information may be sent to the RS 21 by the first UE 15*a* using the first SMS. The second authorization information can also be received by the second UE 15*b* in the form of the SMS service facility. The second authorization information may be sent as the second SMS using the external macro network to the RS 21 either by the associated first or the second UE 15*a*,15*b*.

In another embodiment, the first and/or the second authorization information may comprise an access key information. The access key information may comprise information derived from a secret key e.g. USIM AKA parameters, a one-time password, or a PIN code, etc.

In another embodiment of the procedure 400/400*a*, the first and/or second AN may be identical for at least two AP 11. In this embodiment, where there are multiple AP 11, it may be useful to have a same AN i.e. the UE 15 uses a subscription which is same for two different APs 11 i.e. at home and work.

In another embodiment of the procedure 400/400*a*, the association is performed wherein the first and/or second UE 15 (or any other UE 15 in FIG. 1) provides the first and/or the second authorization information along with an association information e.g. the AP-ID specific for the AP 11 to the RS 21 respectively. As the AN for the multiple AP 11 has an identical value, the authorization information specifically pertaining to the specific AP 11 may be used to distinguish the AP 11 from each other, while doing the ACMM and creating the association in the RS 21.

In an embodiment of procedure 400/400*a*, the first and/or second authorization information and the AP-ID may be received by the RS 21 via the AP GW 16 and the CN 17. In alternate embodiment of procedure 400/400*a*, the first and/or second authorization information and the AP-ID may be received by the RS 21 via the external macro network i.e. via the Macro-RBS 13, the Macro-RNC 18 and the CN 17. In this embodiment, the UE 15 forwards the authorization information and the AP-ID specific to the AP 11 to the RS 21. The RS 21 has a means 21*h* for receiving the first and/or second authorization information and the AP-ID.

In another embodiment of procedure 400/400*a*, the first UE 15*a* and the AP 11 are connected to the RS 21 coupled via the AP GW 16 and the CN 17. The RS 21 here performs procedural steps 400*b* described in the following in conjunction with FIG. 4*b*. In a first step S1, the RS 21 using a first responding means 21*i* is responding to the first authorization information from the first UE 15*a*. The first authorization information is received by the RS 21 through the communication network similar to previous embodiments explained earlier. In a second step S2, the RS 21 using a second responding means 21*k* is responding to the AP-ID from the AP 11. Here the AP 11 sends the AP-ID directly via the AP GW 16 and CN 17 to the RS 21.

In another embodiment of the procedure 400*b*, the RS 21 may receive the first and/or the second authorization information via the external macro network. In this embodiment, there exists mechanism where the UE 15 (i.e. first and/or second UE 15*a,b*) may send the first and/or the second authorization information to the RS 21 via the external macro network, for example to maintain integrity of a secure communication to the RS 21, i.e. before the AP 11 is associated with the UE 15. As described earlier, the SMS service facility may be used by the UE 15 to send the first and/or second authorization information to the RS 21.

In an embodiment of the procedure 400/400*a*/400*b*, the RS 21 has a verifying means 21*l* for verifying if the first and/or second contact request and the first and/or second association request received from the UE 15 for association with the AP 11 are valid. If not, the AP 11 has a rejecting means 21*m* for rejecting the first and/or second association request with the AP 11.

Figure 5:
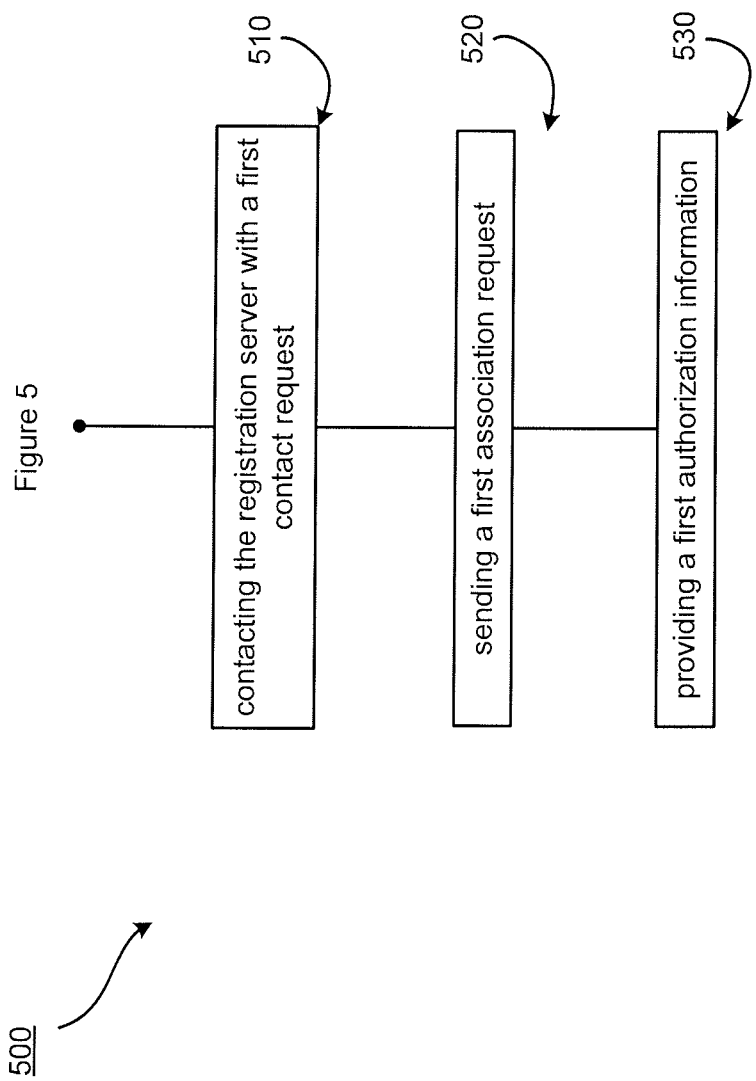
FIG. 5 shows a flow diagram for creation of the association between the first UE and the AP as assisted by the first UE.

Alternatively there exist provisions for creating in the RS 21, the association between the first UE 15a and at least one AP 11 as shown in FIG. 5, where the first UE 15a performs steps according to a procedure 500. In a first step 510, the first UE 15a contacts the RS 21 with the first contact request carried out using the first AN for the AP 11. In a second step 520, the first UE 15a sends the first association request for the association with the AP 11, to the RS 21. In a third step 530, the first UE 15a provides the first authorization information for the authorization by the RS 21. After the procedure 500 is completed, the first UE 15a become the associated first UE 15a associated with the access point, where the association is administered by the RS 21.

In an embodiment of procedure 500, the associated first UE 15a may receive the first registration confirmation from the RS 21, in case of a successful first authorization.

Figure 5A:
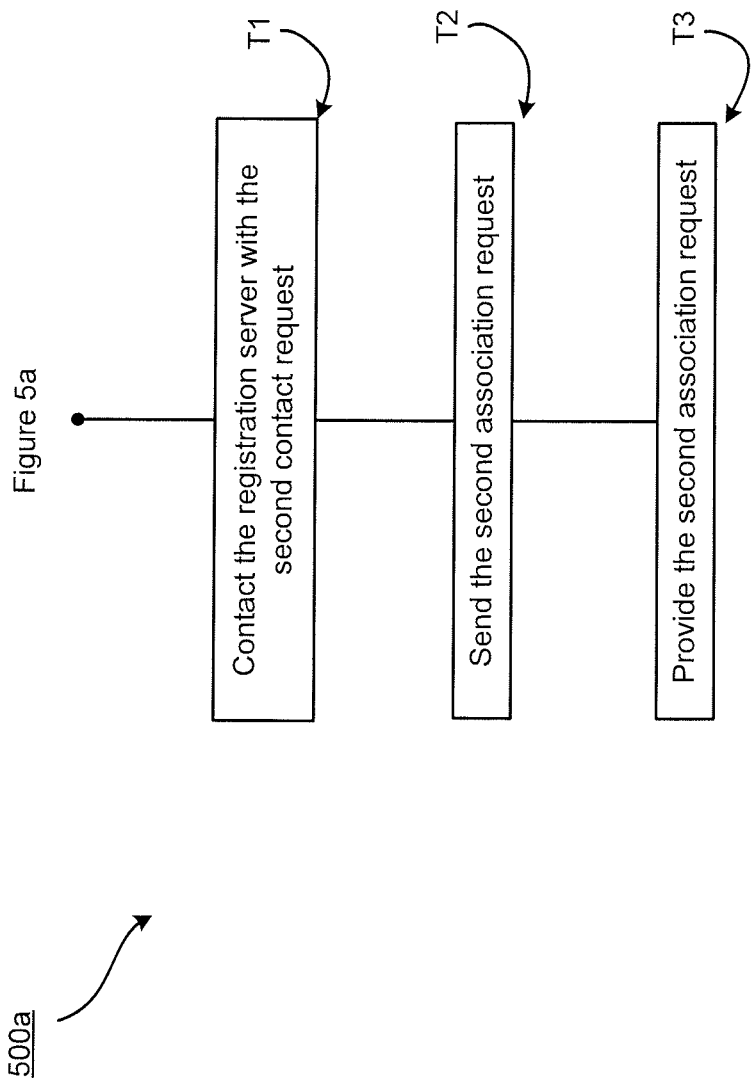
FIG. 5a shows a flow diagram for creation of the second association between the second UE and the AP, as assisted by the associated first UE.

In another embodiment of procedure 500, there exist provisions in the RS 21 for creating the second association between the second UE 15b and the AP 11 assisted by the associated first UE 15a. FIG. 5a shows a procedure 500a, where the associated first UE 15a performs the following steps. In a first step T1, the first UE 15a contacts the RS 21 with the second contact request carried out using the second AN for the AP 11. In a second step T2, the first UE 15a may send the second association request with the identification of the second UE 15b. In a third step T3, the first UE provides the second association request based on the second authorization information regarding the second UE 15b, whereby the second UE 15b becomes the associated second UE 15b associated with the AP 11, with the association being administered by the RS 21.

In another embodiment of the procedure 500/500a, the associated first and/or second UE 15 receiving the second registration confirmation in case of the successful second authorization. Once the second UE 15b is associated, the RS 21 can send the second registration confirmation to the associated first and/or second UE 15a/b.

In another embodiment of the procedure 500/500a, the associated first UE 15a may acquire the first authorization information from the SMS service facility from the CN 17. In another embodiment of the procedure 500/500a, the second UE 15b may also are alternatively acquire the second authorization information from the SMS service facility from the CN 17.

In another embodiment of the procedure 500/500a, the associated first UE 15a or the second UE 15b may send the second authorization information in the form of the second SMS, via the external macro network to the RS 21, as described earlier.

In another embodiment of the procedure 500/500a, the first and/or the second authorization information may include the access key information. In one embodiment the access key information may be derived from a secret/cryptographic key (e.g. USIM AKA parameters). In another embodiment of the procedure 500/500a, the access key information may include or be derived from a one-time password or the PIN code.

In another embodiment of the procedure 500/500a, the association may allow the associated first and/or the second UE 15a,b to access the CS call service. In another embodiment of the procedure 500/500a, the association may allow the associated first and/or the second UE 15a,b to access the PS domain services.

Figure 6:
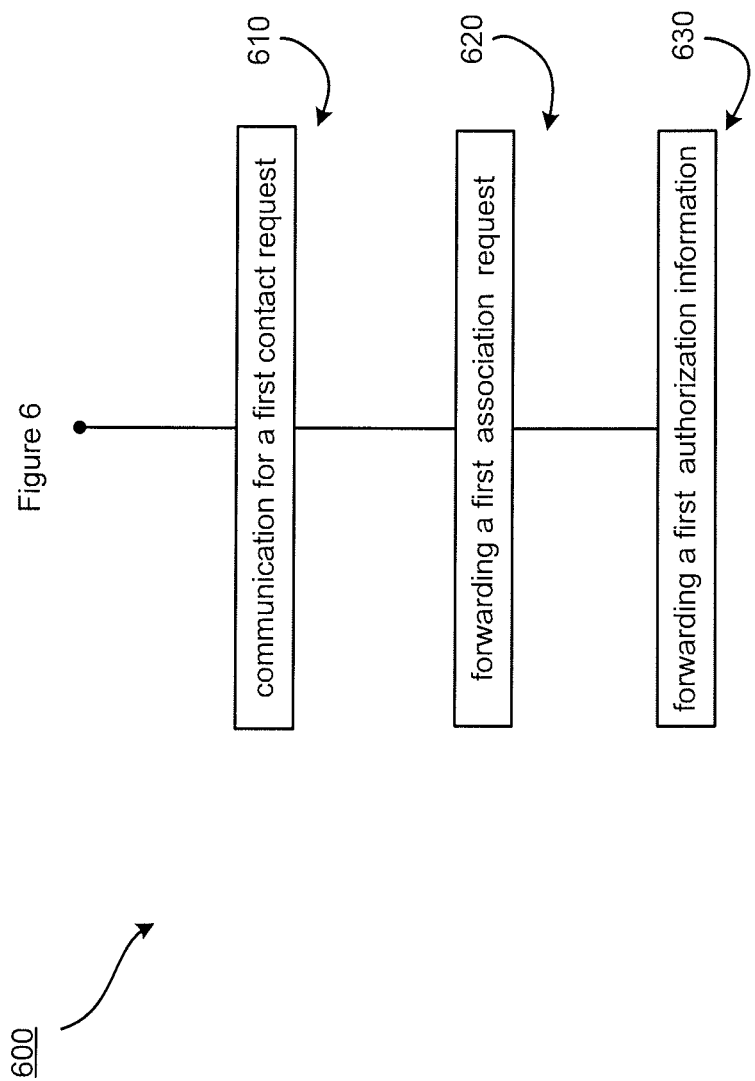
FIG. 6 shows a flow diagram for creation of the association between the first UE and the AP, as assisted by the AP.

Alternatively, there exist provisions for creating in the RS 21, the association between the first UE 15a and at least one AP 11, where the AP 11 performs a procedure 600. FIG. 6 shows the procedure 600 where the AP 11 performs the following steps. In a first step 610, the AP 11 using a first means 117b is providing communication for the first contact request carried out using the first AN for the AP 11, between the first UE 15a and the RS 21. In a second step 620, the AP 11 using a second means 117c is forwarding the first association request for the association with the AP 11, from the first UE 15a to the RS 21. In a third step 630, the AP 11 using a third means 117d is forwarding the first authorization information to the RS 21, whereby the first UE 15a become the associated first UE 15a associated with the AP 11, where the association is administered by the RS 21.

In an embodiment of procedure 600, the AP 11 has an associating means 117e to associate with the associated first UE 15a in case of the successful authorization, which is being administered by the RS 21.

In an embodiment of procedure 600, the AP 11 has the verifying means 21l for verifying if the first and/or second contact request and the first and/or second association request received from the UE 15 for association with the AP 11 are valid. If not, the AP 11 has the rejecting means 21m for rejecting the first and/or second association request with the AP 11.

Figure 7:
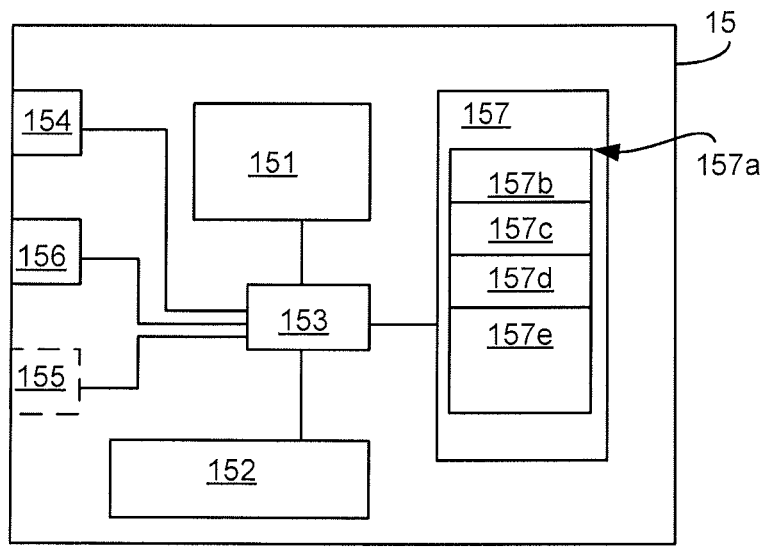
FIG. 7 shows very schematically an embodiment of the UE.

FIG. 7 shows very schematically an embodiment of the UE 15. Comprised in the UE 15 are a display 151 which may be touch-sensitive for provisioning of graphically displayed buttons, an inputting means 152 in the form of e.g. buttons, an user equipment processor 153 which may or may not comprise a DSP (Digital Signal Processor) and an encoding and a decoding modules, a telecommunications interface 154 in the form of a transceiver unit comprising at least one antenna and amplifier adapted for communication with units in the telecommunications network (see FIG. 1). The telecommunication interface 154 may have a transceiver adapted for wireless communication with 3GPP GSM, WCDMA, an Evolved Universal Terrestrial Radio Access Network (E-UTRAN). Further, a transceiver 156 may be adapted for communication via the IEEE 802.11 and/or IEEE 802.15 and/or 802.16, etc. The UE 6 may also comprise a communications interface 155 for communication in a wireless local network.

Furthermore the UE 15 comprises at least one computer program product in the form of a user equipment memory 157 in the form of a non-volatile memory, e.g. an EEPROM (Electrically Erasable Programmable ROM)/ROM (Read-Only Memory) and a flash memory. The computer program product 157 comprises a computer program 157a, which comprises a code means which when run on the UE 15 causes the UE 15 to perform the steps of the procedure 500 described earlier.

Hence in the exemplary embodiments described earlier, the code means in the computer program 157a of the UE 15 comprises the contact means 157b, the sending means 157c, the providing means 157d, the confirmation means 157e, in the form of computer program code structured in computer program modules.

Although the code means in the embodiments disclosed above are implemented as computer program modules which when run on the UE 15 causes the UE 15 to perform steps described later in the conjunction with FIGS. 2, 3a, 3b, 5, 5a. At least one of the code means may in alternative embodiments be implemented at least partly as hardware circuits such shown in FIG. 7. The code means may be implemented within the memory 157.

Figure 8:
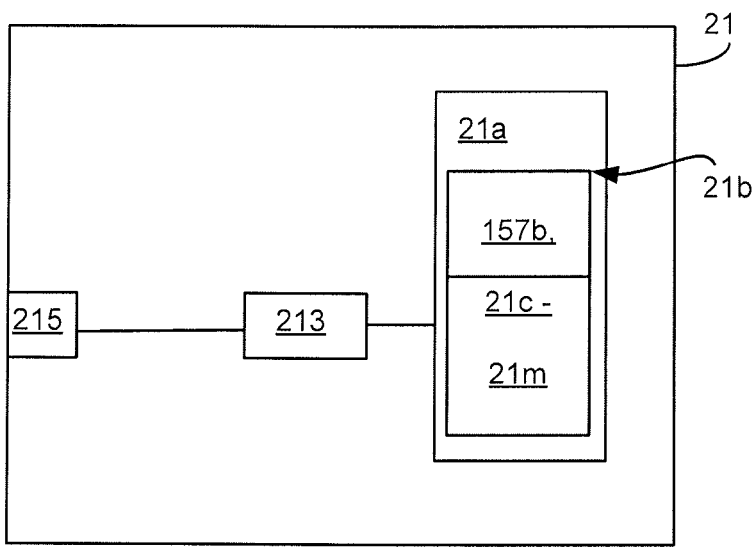
FIG. 8 shows very schematically an embodiment of the RS.

FIG. 8 shows very schematically an embodiment of the RS 21. Comprised in the RS 21, a processing unit 213 e.g. with a DSP (Digital Signal Processor) and an encoding and a decoding modules. The RS 21 also comprises a communications interface 215 for communication with the CN 17 (see FIG. 1).

Furthermore the RS 21 comprises at least one computer program product in that the RS database 21a in the form of a non-volatile memory, e.g. an EEPROM and a flash memory or a disk drive. The computer program product 21a comprises a computer program 21b, which comprises a code means which when run on the RS 21 causes the RS 21 to perform the steps of the procedure 400 described earlier.

Hence in the exemplary embodiments described earlier, the code means in the computer program 21b of the RS 21 comprises the contact means 157b, the receiving means 21c, the authorizing means 21d, the registering means 21e, the responding means 21f, the informing means 21g, the means 21h, the first responding means 21i, the second responding means 21k, the verifying means 21l, the rejecting means 21m in the form of computer program code structured in computer program modules.

Although the code means in the embodiments disclosed above are implemented as computer program modules which when run on the RS 21 causes the RS 21 to perform steps described later in the conjunction with FIGS. 2, 3a, 3b, 4, 4a, 4b. At least one of the code means may in alternative embodiments be implemented at least partly as hardware circuits such shown in FIG. 8. The code means may be implemented within the registration server database 21a.

Figure 9:
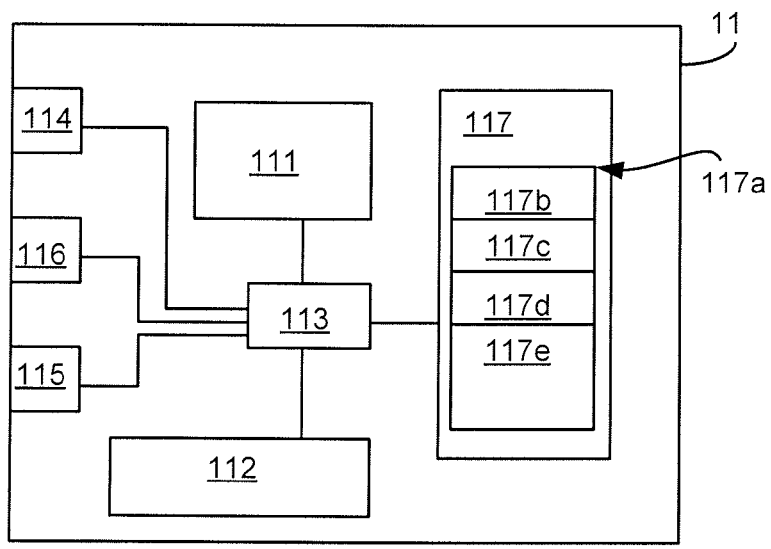
FIG. 9 shows very schematically an embodiment of the AR

FIG. 9 shows very schematically an embodiment of the AP 11. Comprised in the AP 11, a processing unit 113 i.e. with a DSP (Digital Signal Processor) and an encoding and a decoding modules, a telecommunications interface 114 in the form of a transceiver unit comprising at least one antenna and amplifier adapted for communication with units in the telecommunications network (see FIG. 1). The telecommunications interface 114 may have a transceiver adapted for wireless communication with 3GPP GSM. WCMDA, the E-UTRAN. Further a transceiver 116 may be adapted for communication via the IEEE 802.11, and/or IEEE 802.15, and/or 802.16 etc. The AP 11 also may comprise a communications interface 115 for communication in a wireless local network. In alternative embodiment of the AP 11, there may be a display 111, an inputting means 112 in the form of e.g. buttons.

Furthermore the AP 11 comprises at least one computer program product in that a AP memory 117 in the form of a non-volatile memory, e.g. an EEPROM and a flash memory or disk drive. The computer program product 117 comprises a computer program 117a, which comprise a code means which when run on the AP 11 causes the AP 11 to perform the steps of the procedure 600 described earlier.

Hence in the exemplary embodiments described earlier, the code means in the computer program 117a of the AP 11 comprises the first means, the second means, the third means, the associating means, the verifying means 21l, the rejecting means 21m in the form of computer program code structured in computer program modules.

Although the code means in the embodiments disclosed above are implemented as computer program modules which when run on the AP 11 causes the AP 11 to perform steps described later in the conjunction with FIGS. 2, 3a, 3b, 6. At least one of the code means may in alternative embodiments be implemented at least partly as hardware circuits such shown in FIG. 9. The code means may be implemented within the access point memory 117.

The person skilled in the art, having knowledge after reading the above description would also conceive other embodiments as shown in the description below.

The creation, in the RS 21, of associations between the second UE 15b and at least one AP 11 may be carried out using the AN and the authorization information, assisted by the first UE 15a. The first UE 15a e.g. is already associated to the AP 11 in the sense of having privilege to administrate access rights to these APs 11. The first UE 15a may have been associated to the APs 11 by any method, e.g. by manual configuration of the RS 21.

There exists in the RS 21, means for creating the association between the second UE 15b and the AP 11, assisted by the first UE 15a. The method and/or arrangement may comprise that the RS 21 performs the following steps:

responding to the contact request carried out using the AN for at least one AP 11, where the contact request is issued by the first UE 15a using the communication device providing communication between the first UE 15a and the RS 21;

receiving the association request with the identification of the second UE 15b for the association of the second UE 15b and the at least one AP 11, provided by the first UE 15a;

authorizing the association request regarding the second UE 15b based on the authorization information provided by the first UE 15a and/or the second UE 15b;

registering the association between the second UE 15b and the at least one AP 11 in case of successful authorization, whereby the second UE 15b becomes the associated second UE 15b associated with the at least one AP 11, where the association is administrated by the RS 21.

The communication device is at least one AP 11 for providing communication between the first and/or second UE 15a/b and the RS 21. The first UE 15a may use said AP 11 for communicating the association request to the RS 21. Further the first UE 15a may be granted limited or no privilege to use said AP 11 e.g. an emergency call maybe provided.

The invention claimed is:

1. A method for creating, in a registration server, an association between a first user equipment and an access point that is part of a communication network and is configured to provide communication between the first user equipment and the registration server, the method comprising:

responding to a first contact request carried out using a first association number for the access point, provided by the first user equipment, wherein the first association number is pre-registered in the access point, which provides the communication between the first user equipment and the registration server, based on the use of the first association number, until the association is completed;

receiving a first association request for the association with the access point, provided by the first user equipment;

authorizing the first association request based on first authorization information provided by the first user equipment;

registering the association between the first user equipment and the access point responsive to authorization of the first association request;

responding to a second contact request carried out using a second association number for the access point, where the second contact request is provided by the associated first user equipment, wherein the second association number is pre-registered in the access point;

receiving a second association request with an identification of a second user equipment, provided by the associated first user equipment;

authorizing the second association request based on a second authorization information provided by the associated first user equipment and/or the second user equipment regarding the second user equipment; and registering the second association between the second user equipment and the access point responsive to authorization of the second association request;

wherein the first user equipment is associated with the access point and the association is administered by the registration server; and wherein the second user equipment is associated with the access point and the second association is administered by the registration server.

2. The method according to claim 1, further comprising:
informing the associated first user equipment with a first registration confirmation responsive to authorization of the first association request.

3. A method of operating a first user equipment to create, in a registration server, an association between the first user equipment and an access point, the method comprising:
contacting the registration server with a first contact request carried out using a first association number for the access point, wherein the first association number is pre-registered in the access point, which provides communication between the first user equipment and the registration server, based on the use of the first association number, until the association is completed;
sending a first association request for the association with the access point to the registration server;
providing a first authorization information for an authorization by the registration server;
contacting the registration server with a second contact request carried out using a second association number for the access point, wherein the second association number is pre-registered in the access point;
sending a second association request with an identification of a second user equipment; and
providing the second association request based on a second authorization information regarding the second user equipment;
wherein the first user equipment is associated with the access point and the association is administered by the registration server; and
wherein the second user equipment is associated with the access point and the second association is administered by the registration server.

4. The method according to claim 3, further comprising:
receiving a first registration confirmation responsive to authorization of the first association request.

5. A method for operating an access point to create, in a registration server, an association between a first user equipment and the access point, the method comprising:
providing communication for a first contact request carried out using a first association number for the access point, between the first user equipment and the registration server, the communication being based on the use of the first association number, which is pre-registered in the access point, until the association is completed;
forwarding a first association request for the association with the access point from the first user equipment to the registration server;
forwarding a first authorization information to the registration server;
providing communication for a second contact request carried out using a second association number for the access point, between the first user equipment and the registration server, the communication being based on the use of the second association number, which is pre-registered in the access point, until the association is completed;
forwarding a second association request with an identification of a second user equipment, provided by the associated first user equipment; and
forwarding a second authorization information to the registration server;
wherein the first user equipment is associated with the access point responsive to authorization of the first association request and the association is administered by the registration server; and
wherein the second user equipment is associated with the access point responsive to authorization of the second association request and the association is administered by the registration server.

6. The method according to claim 5, further comprising:
verifying if the first contact request and the first association request received from the user equipment for association with the access point are valid; and
rejecting the first association request when the first contact request and/or the first association request are not valid.

7. A non-transitory computer program product for user equipment connected to a telecommunication network, to create, in a registration server, an association between the user equipment and an access point, administered by a registration server, the user equipment having a user equipment memory and a user equipment processor, the user equipment memory comprises a computer program, which comprises a code means which when run on the user equipment causes the user equipment to:
contact the registration server with a first contact request carried out using a first association number for the access point, wherein the first association number is pre-registered in the access point, which provides communication between the first user equipment and the registration server, based on the use of the first association number, until the association is completed;
send a first association request for the association with the access point to the registration server;
provide a first authorization information for an authorization by the registration server;
contact the registration server with a second contact request carried out using a second association number for the access point, wherein the second association number is pre-registered in the access point;
send a second association request with an identification of a second user equipment; and
provide the second association request based on a second authorization information regarding the second user equipment.

8. A non-transitory computer program product for a registration server to create an association between a first user equipment and an access point that is part of a communication network and is configured to provide communication between the first user equipment and the registration server, the registration server further having a registration server database and a processor unit, the computer program product comprises a computer program, which comprises a code means which when run on the registration server causes the registration server to:
respond to a first contact request carried out using a first association number for the access point, provided by the first user equipment, wherein the first association number is pre-registered in the access point, which provides the communication between the first user equipment and the registration server, based on the use of the first association number, until the association is completed;
receive a first association request for the association with the access point, provided by the first user equipment;

authorize the first association request based on first authorization information provided by the first user equipment;

register the association between the first user equipment and the access point responsive to authorization of the first association request;

respond to a second contact request carried out using a second association number for the access point, where the second contact request is provided by the associated first user equipment, wherein the second association number is pre-registered in the access point;

receive a second association request with an identification of a second user equipment, provided by the associated first user equipment;

authorize the second association request based on a second authorization information provided by the associated first user equipment and/or the second user equipment regarding the second user equipment; and register the second association between the second user equipment and the access point responsive to authorization of the second association request.

9. A non-transitory computer program product for a access point to create, in a registration server, an association between a first user equipment and the access point, the access point having a access point memory and a processing unit, the access point memory comprises a computer program, which comprises a code means which when run on the access point causes the access point to:

provide communication for a first contact request carried out using a first association number for the access point, between the first user equipment and the registration server, the communication being based on the use of the first association number, which is pre-registered in the access point, until the association is completed;

forward a first association request for the association with the access point from the first user equipment to the registration server;

forward a first authorization information to the registration server;

provide communication for a second contact request carried out using a second association number for the access point, between the first user equipment and the registration server, the communication being based on the use of the second association number, which is pre-registered in the access point, until the association is completed;

forward a second association request with an identification of a second user equipment, provided by the associated first user equipment; and forward a second authorization information to the registration server.

10. A registration server configured to create an association between a first user equipment and an access point that is part of a communication network and is configured to provide communication between the first user equipment and the registration server, the registration server comprising:

a registration server database;

a processor unit;

a contact means for responding to a first contact request carried out using a first association number for the access point, provided by the first user equipment, wherein the first association number is pre-registered in the access point, which provides the communication between the first user equipment and the registration server, based on the use of the first association number, until the association is completed;

a receiving means for receiving a first association request for the association with the access point, provided by the first user equipment;

an authorizing means for authorizing the first association request based on first authorization information provided by the first user equipment;

a registering means for registering the association between the first user equipment and the access point responsive to authorization of the first association request;

a responding means for responding to a second contact request carried out using a second association number for the access point, where the second contact request is provided by the associated first user equipment, wherein the second association number is pre-registered in the access point;

the receiving means further configured for receiving a second association request with an identification of the second user equipment, provided by the associated first user equipment;

the authorizing means further configured for authorizing the second association request based on a second authorization information provided by the associated first user equipment and/or the second user equipment regarding the second user equipment; and the registering means further configured for registering the second association between the second user equipment and the access point responsive to authorization of the second association request;

wherein the first user equipment is associated with the access point and the association is administered by the registration server; and wherein the second user equipment is associated with the access point and the second association is administered by the registration server.

11. A first user equipment configured to create, in a registration server, an association between the first user equipment and an access point, the user equipment comprising:

a memory;

a processor;

a contact means for contacting the registration server with a first contact request carried out using a first association number for the access point, wherein the first association number is pre-registered in the access point, which provides communication between the first user equipment and the registration server, based on the use of the first association number, until the association is completed;

a sending means for sending a first association request for the association with the access point to the registration server;

a providing means for providing a first authorization information for an authorization by the registration server;

a second contact means for contacting the registration server with a second contact request carried out using a second association number for the access point, wherein the second association number is pre-registered in the access point;

a second sending means for sending a second association request with an identification of a second user equipment; and a second providing means for providing the second association request based on a second authorization information regarding the second user equipment;

wherein the first user equipment is associated with the access point and the association is administered by the registration server; and wherein the second user equipment is associated with the access point and the second association is administered by the registration server.

12. An access point configured to create, in a registration server, an association between a first user equipment and the access point, the access point comprising:
- an access point memory, in which an association number is pre-registered;
- a processing unit;
- a first means for providing communication for a first contact request carried out using a first association number for the access point, between the first user equipment and the registration server, the communication being based on the use of the first association number, which is pre-registered in the access point, until the association is completed;
- a second means for forwarding a first association request for the association with the access point from the first user equipment to the registration server;
- a third means for forwarding a first authorization information to the registration server;
- a fourth means for providing communication for a second contact request carried out using a second association number for the access point, between the first user equipment and the registration server, the communication being based on the use of the second association number, which is pre-registered in the access point, until the association is completed;
- a fifth means for forwarding a second association request with an identification of a second user equipment, provided by the associated first user equipment; and
- a sixth means for forwarding a second authorization information to the registration server;
- an associating means for associating the first user equipment with the access point responsive to authorization of the first association request and the association is administered by the registration server; and
- a second associating means for associating the second user equipment with the access point responsive to authorization of the second association request and the association is administered by the registration server.

* * * * *

UNITED STATES PATENT AND TRADEMARK OFFICE
CERTIFICATE OF CORRECTION

PATENT NO. : 8,811,987 B2
APPLICATION NO. : 13/140818
DATED : August 19, 2014
INVENTOR(S) : Selander et al.

Page 1 of 1

It is certified that error appears in the above-identified patent and that said Letters Patent is hereby corrected as shown below:

In the Specification

In Column 9, Line 49, delete "AR" and insert -- AP. --, therefor.

In Column 15, Line 47, delete "the the" and insert -- the --, therefor.

Signed and Sealed this
Twenty-first Day of April, 2015

Michelle K. Lee
*Director of the United States Patent and Trademark Office*